United States Patent [19]

Vadasz F.

[11] Patent Number: 5,044,395

[45] Date of Patent: Sep. 3, 1991

[54] MINIMUM PRESSURE DROP COMPOSITE PLUG RETENTION VALVE

[75] Inventor: Ammon M. Vadasz F., San Antonio de los Altos, Venezuela

[73] Assignee: Intevep, S.A., Caracas, Venezuela

[21] Appl. No.: 603,444

[22] Filed: Oct. 26, 1990

[51] Int. Cl.[5] ............................................. F16K 15/00
[52] U.S. Cl. ................................................... 137/512.1
[58] Field of Search ......................... 137/512.1, 512.2; 251/902

[56] References Cited

U.S. PATENT DOCUMENTS

| | | | |
|---|---|---|---|
| 213,186 | 3/1879 | Gassett | 137/512.1 |
| 919,036 | 4/1909 | Langer | 137/512.1 |
| 1,049,922 | 1/1913 | Robertson | 137/512.1 |
| 2,296,492 | 9/1942 | Begley, Sr. | 137/512.1 |
| 2,622,615 | 12/1952 | Golden et al. | 137/512.1 |
| 3,378,029 | 4/1968 | Lee | 137/512.1 |
| 3,703,913 | 11/1972 | Carsten | 137/512.1 X |
| 3,898,999 | 8/1975 | Haller | 137/512.1 |
| 3,999,898 | 12/1976 | Chomczyk et al. | 137/512.1 X |
| 4,603,615 | 8/1986 | Ashley | 137/512.1 X |

FOREIGN PATENT DOCUMENTS 640351 12/1936 Fed. Rep. of Germany ... 137/512.1

Primary Examiner—John Rivell
Attorney, Agent, or Firm—Bachman & LaPointe

[57] ABSTRACT

A multiple plug check valve for use in a process for pumping a two-phase mixture is designed so as to minimize pressure drop across the valve thereby maximizing flow of fluid through the valve body.

4 Claims, 1 Drawing Sheet

MINIMUM PRESSURE DROP COMPOSITE PLUG RETENTION VALVE

BACKGROUND OF THE INVENTION

The present invention is drawn to a check valve and, more particularly, a multiple component plug check valve employed in a pumping unit for pumping crudes and the like wherein the check valve has a specific design which guarantees minimum pressure drop across the valve and thus maximum flow through the valve body.

In the petroleum industry, positive displacement pumps are used in numerous applications including the pumping of crudes from subsurface wells. Typical positive displacement pumps used in the petroleum industry employ intake and discharge valves which are typically check valves which comprise a valve seat onto which a ball rests and seals against the valve seat. A typical positive displacement pump is disclosed, for example, in U.S. Pat. No. 4,018,547.

The typical check valve configuration is very efficient when pumping liquids. However, it has been found that if a reciprocating positive displacement pump is used to pump a two-phase mixture, that is, a gas-liquid mixture, the pumping efficiency rapidly decreases as the gas content of the two-phase mixture increases. It is quite common in the petroleum industry when pumping crudes from subsurface wells to have a gas entrained in the crude. In order to maximize pumping efficiency when pumping a two-phase mixture with a reciprocating positive displacement pump, it has been found that typical check valves as discussed above are unsatisfactory. In order to increase pumping efficiency, it has been found that the valves employed should offer a minimum restriction to flow through them as a large restriction would produce an increase in pressure drop across the valves which in turn causes part of the liquid phase of the two-phase mixture being pumped to flash into the gaseous phase thereby resulting in a decrease in efficiency of the pumping operation. This phenomena occurs when employing downhole reciprocating pumps to extract oil from underground reservoirs. In addition, a critical condition known as gas lock is a common occurrence in oil field operations and the origin of this phenomena has been traced to excessive pressure drop which occurs across the typical intake valves of the reciprocating pumps. Gas lock is a phenomena wherein the mechanical work done by the subsurface pump is used to compress and expand large gas bubbles trapped inside the pump without any pumping of the crude oil being effected. A similar critical condition known as steam lock occurs when steam has been injected downhole into wells in order to stimulate crude recovery.

Naturally, it would be highly desirable to provide an improved check valve construction which would minimize pressure drop across the intake and discharge valves of a positive displacement pump and thereby maximize flow through the valve body resulting in improved pumping efficiency while eliminating gas lock, steam lock and other disadvantages noted above with respect to typical check valves presently employed in the art.

Accordingly, it is the principal object of the present invention to provide a check valve wherein the pressure drop across the check valve is minimized so as to insure maximum flow through the check valve.

It is a particular object of the present invention to provide a check valve as aforesaid which is a multicomponent plug check valve.

It is a further object of the present invention to provide a check valve as aforesaid which is of relatively simple construction and inexpensive to manufacture.

Further objects and advantages of the present invention will appear hereinbelow.

SUMMARY OF THE INVENTION

In accordance with the present invention the foregoing objects and advantages are readily obtained.

The present invention is drawn to an improved multicomponent plug check valve having a specific design which guarantees minimum pressure drop across the valve and thus maximum flow through the valve. The present invention further relates to a process for efficiently pumping a two-phase gas mixture which employs the multiple component plug check valve of the present invention.

In accordance with the present invention, the check valve comprises a housing having a valve seat secured therein. The valve seat defines a first flow area $A_1$. A valve stop is disposed within the housing downstream of the valve seat and defines therewith a chamber. A solid valve plug is positioned within the chamber and the valve plug is so designed so as to have an outer periphery which defines with the housing an annular flow passage $A_2$. Disposed between the valve plug and the valve seat within the chamber is at least one hollow valve ring. The hollow valve ring has an internal flow area $A_3$. In addition, the outer periphery of the hollow valve ring defines with the housing an external flow area $A_4$. The flow areas are dimensioned such that flow area $A_1$ is (1) substantially equal to $A_2$ and (2) substantially equal to $A_3+A_4$. When the valve is in its closed position the valve ring seats directly on the valve seat and the valve plug seats on the valve ring so as to close off flow area $A_3$.

In accordance with the preferred embodiment of the present invention, a plurality of hollow valve rings are disposed in series between the valve plug and the valve seat. The plurality of hollow valve rings vary in configuration such that the internal and external dimensions of each valve ring define an internal flow area $A_i$ and an external annular flow area $A_e$ wherein $A_i+A_e$ of each of said plurality of valve rings is substantially equal to $A_1$. The dimension $A_i$ decreases and the dimension $A_e$ increases for each hollow valve ring as the valve rings progress from the valve seat toward the valve plug.

By employing a check valve as aforesaid, pressure drop across the valve is minimized thereby maximizing flow through the valve body which results in maximum pumping efficiency while prohibiting gas lock and steam lock.

DETAILED DESCRIPTION

Figures 1, 2:
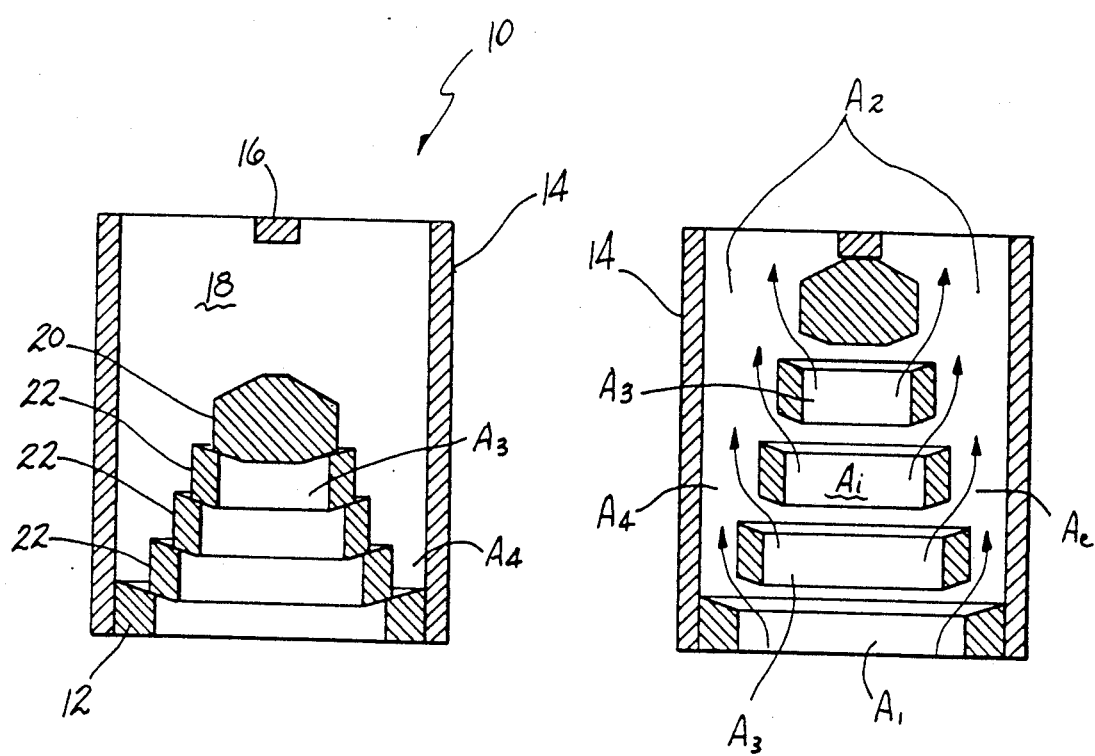
FIG. 1 is a longitudinal sectional view through a preferred embodiment of the check valve in accordance with the present invention showing the check valve in its closed position.
FIG. 2 is a view similar to FIG. 1 showing the check valve of the present invention in its open position.

Referring to FIG. 1, a check valve 10 comprises a valve seat 12 which is fixed to a valve housing 14.

Spaced from the valve seat 12 and downstream thereof in the direction of flow through the check valve is a stop 16 which defines with the valve seat 12 and the housing 14 a valve chamber 18. Mounted within the valve chamber 18 between the valve seat 12 and the valve stop 16 is a valve plug 20 which is free to reciprocally move within the chamber 18. In accordance with the present invention, a hollow valve ring is positioned between the valve seat 12 and the valve plug 20. In accordance with the preferred embodiment of the present invention, a plurality of valve rings 22 are provided between the valve seat 12 and the valve plug 20.

As previously noted, the check valve of the present invention is so designed so as to guarantee minimum pressure drop across the valves and maximum flow through the valve body. In order to accomplish the foregoing, it is critical that the flow area $A_1$ defined by the valve seat 12 be substantially equal to the annular flow area $A_2$ which is defined by the outer peripheral surface of valve plug 20 and housing 14. In addition to the foregoing, it is a further critical feature that the sum of the external annular flow area $A_4$ and internal flow area $A_3$ of each of the valve rings 22 be substantially equal to the flow area of $A_1$ and $A_2$. The external annular flow area $A_4$ of each ring is defined by the outer periphery of each valve ring 22 and the housing 14 while the internal flow area $A_3$ is defined by the hollow passage through each of the valve rings 22.

As can readily be seen in FIGS. 1 and 2, when a plurality of hollow valve rings are employed they are disposed in series between the valve plug and the valve seat and the internal flow area $A_i$ of each valve ring decreases while the external annular flow area $A_e$ of each valve ring increases a the valve rings progress from the valve seat toward the valve plug. In addition, with particular reference to FIG. 1, it can be seen that when the valve is in its closed position, the valve ring 22 seats on the valve seat 12 in a sealing manner while the valve plug 20 seats on the valve ring so as to close the flow area $A_3$ defined thereby. By insuring the foregoing relationship, the pressure drop across the valve is minimized and the flow through the valve body is maximized thereby eliminating the disadvantages noted above with regard to check valves heretofore employed in the pumping of crudes and the like by positive displacement pumps.

In order to further maximize pumping efficiency, the surfaces of the valve plug, valve body, valve seat, valve stop and hollow valve rings which will be contacted by the flowing fluid should be as smooth as possible so as to reduce drag and thereby avoid any pressure drop which may occur as the fluid passes over these surfaces. In addition, the surfaces of the valve plug and the valve body which contact each other, namely, the external diameter portions, should be coated with abrasion resistant, low friction material so as to reduce wear.

In addition to the foregoing, in order to maximize proper contact between the sealing surfaces of the valve plug 20, valve rings 22 and valve seat 12, it is desirable to form the sealing surface as spherical zones which, preferably, have a radius of curvature equal to the radius of the internal diameter of the valve housing 14.

By providing a multiple component plug check valve as aforesaid, pressure drop across the valve is minimized thus maximizing flow through the valve body thereby maximizing pumping efficiency and prohibiting the phenomena of gas lock and/or steam lock.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A check valve comprising a housing; a valve seat secured within said housing, said valve seat defining a first flow area $A_1$; a valve stop disposed in said housing and defining therewith and said valve seat a chamber; a solid valve plug positioned within said chamber, said valve plug having a outer periphery which defines with said housing a second annular flow area $A_2$; and at least one hollow valve ring disposed between said valve plug and said valve seat, said hollow valve ring having an internal flow area $A_3$ and an outer periphery which defines with said housing and external annular flow area $A_4$ wherein $A_1$ is (1) substantially equal to $A_2$ and (2) substantially equal to $A_3+A_4$.

2. A check valve according to claim 1 wherein said at least one valve ring seats on said valve seat and said valve plug seats on said at least one valve ring when said check valve is in its closed position.

3. A check valve according to claim 1 wherein a plurality of valve rings are disposed in series between said valve plug and said valve seat, said plurality of hollow valve rings having varying internal and external dimensions defining for each of said valve rings an internal flow area $A_i$ and an external annular flow area with the housing wherein $A_i+A_e$ of each valve ring is substantially equal to $A_1$.

4. A check valve according to claim 3 wherein $A_i$ decreases and $A_e$ increases for each of said valve rings as said valve rings progress from said valve seat toward said valve plug.

* * * * *

UNITED STATES PATENT AND TRADEMARK OFFICE
CERTIFICATE OF CORRECTION

PATENT NO. : 5,044,395

DATED : September 3, 1991

INVENTOR(S) : Amnon M. Vadasz F.

It is certified that error appears in the above-identified patent and that said Letters Patent is hereby corrected as shown below:

Title page, (75) Inventor:

"Ammon M. Vadasz F." should read --Amnon M. Vadasz F.--

Col. 4, Claim 3, line 46,

After "flow area", second occurrence, insert --$A_e$--

Signed and Sealed this

Twenty-ninth Day of December, 1992

*Attest:*

DOUGLAS B. COMER

*Attesting Officer*  *Acting Commissioner of Patents and Trademarks*